(12) United States Patent
Malikov et al.

(10) Patent No.: US 12,512,206 B2
(45) Date of Patent: *Dec. 30, 2025

(54) SYSTEM AND METHOD FOR PROVIDING FERTILITY ENHANCING DIETARY AND LIFESTYLE RECOMMENDATIONS

(71) Applicant: SOCIETE DES PRODUITS NESTLE S.A., Vevey (CH)

(72) Inventors: Evgueni Malikov, Mendham, NJ (US); Frederic Ronga, St-Cierges (CH); Myriam Afeiche Zehil, Lausanne (CH); Mary Christ, Florham Park, NJ (US)

(73) Assignee: Societe des Produits Nestle S.A., Vevey (CH)

( * ) Notice: Subject to any disclaimer, the term of this patent is extended or adjusted under 35 U.S.C. 154(b) by 965 days.

This patent is subject to a terminal disclaimer.

(21) Appl. No.: 17/633,333

(22) PCT Filed: Jul. 29, 2020

(86) PCT No.: PCT/EP2020/071333
§ 371 (c)(1),
(2) Date: Feb. 7, 2022

(87) PCT Pub. No.: WO2021/023589
PCT Pub. Date: Feb. 11, 2021

(65) Prior Publication Data
US 2022/0293240 A1  Sep. 15, 2022

Related U.S. Application Data

(60) Provisional application No. 62/883,766, filed on Aug. 7, 2019.

(51) Int. Cl.
*A61B 5/00* (2006.01)
*G16H 10/20* (2018.01)
(Continued)

(52) U.S. Cl.
CPC ............. *G16H 20/60* (2018.01); *G16H 10/20* (2018.01); *G16H 20/30* (2018.01); *G16H 50/20* (2018.01); *G16H 50/30* (2018.01); *G16H 50/70* (2018.01)

(58) Field of Classification Search
CPC .......... A61B 5/00; G16H 20/60; G16H 10/20; G16H 20/30; G16H 50/20; G16H 50/30; G16H 50/70
See application file for complete search history.

(56) References Cited

U.S. PATENT DOCUMENTS 10,744,173 B2 *  8/2020  Xiao ................... A61K 36/704
11,350,912 B2 *  6/2022  Vitti ................... A61B 10/0012
(Continued)

FOREIGN PATENT DOCUMENTS

CN  104981834 A  10/2015
JP  2001353158 A  12/2001
(Continued)

OTHER PUBLICATIONS

Gaskins et al. "Dietary Patterns and Outcomes of Assisted Reproduction" Am J. Obstet Gynecol., Jun. 2019, vol. 220, No. 6, pp. 547.e1-567.e18.
(Continued)

*Primary Examiner* — May A Abouelela
(74) *Attorney, Agent, or Firm* — K&L Gates LLP

(57) ABSTRACT

Methods and systems for generating evidence-based dietary and lifestyle recommendations are presented. In one embodiment, a method is provided that includes requesting and receiving a plurality of user attributes. The method may further include comparing the user attributes to corresponding evidence-based fertility benchmarks and determining fertility support opportunities based on the user attributes and the comparisons to the corresponding evidence-based
(Continued)

fertility benchmarks. In an embodiment, the method may also include identifying fertility enhancing recommendations based on the fertility support opportunities, and presenting at least one of the plurality of fertility enhancing recommendations.

6 Claims, 6 Drawing Sheets

(51) Int. Cl.
*G16H 20/30* (2018.01)
*G16H 20/60* (2018.01)
*G16H 50/20* (2018.01)
*G16H 50/30* (2018.01)
*G16H 50/70* (2018.01)

(56) References Cited

U.S. PATENT DOCUMENTS

| | | | | |
|---|---|---|---|---|
| 2007/0082329 A1* | 4/2007 | Williams | | G01N 33/5044 |
| | | | | 705/2 |
| 2009/0177496 A1* | 7/2009 | Tuck | | G08B 1/08 |
| | | | | 706/54 |
| 2011/0178879 A1* | 7/2011 | Tuck | | G06Q 50/01 |
| | | | | 709/204 |
| 2011/0202362 A1* | 8/2011 | Strobel | | G06Q 10/06 |
| | | | | 705/2 |
| 2011/0208348 A1* | 8/2011 | Bogue | | A61J 7/0076 |
| | | | | 600/300 |
| 2012/0179012 A1* | 7/2012 | Saffarian | | A61B 10/0012 |
| | | | | 600/300 |
| 2013/0137940 A1 | 5/2013 | Schafer | | |
| 2014/0107934 A1* | 4/2014 | Elashoff | | G16H 50/20 |
| | | | | 702/19 |
| 2015/0142331 A1* | 5/2015 | Beim | | G16B 20/10 |
| | | | | 702/19 |
| 2016/0140314 A1 | 5/2016 | Karchmer et al. | | |
| 2016/0246947 A1* | 8/2016 | Yao | | G16H 10/20 |
| 2017/0351806 A1* | 12/2017 | Beim | | G16B 20/20 |
| 2018/0214068 A1* | 8/2018 | Munne | | C12Q 1/6883 |
| 2018/0344236 A1* | 12/2018 | Yun | | A61B 5/4318 |
| 2019/0103180 A1 | 4/2019 | Denise et al. | | |
| 2019/0192010 A1* | 6/2019 | Mane | | A61B 5/165 |
| 2019/0320976 A1* | 10/2019 | Roslin | | G16H 20/60 |
| 2020/0030342 A1* | 1/2020 | Gleicher | | A61K 31/566 |

FOREIGN PATENT DOCUMENTS

| | | |
|---|---|---|
| JP | 2015531484 A | 11/2015 |
| JP | 2018023477 A | 2/2018 |
| JP | 2018092331 A | 6/2018 |
| KR | 20150083235 A | 7/2015 |
| WO | 2015147174 A1 | 10/2015 |

OTHER PUBLICATIONS

Japanese Office Action for Appl No. 2022-502181 dated Feb. 18, 2025, 6 pages.
Chinese Office Action for Appl No. 202080054778.4 dated Dec. 25, 2024, 14 pages.
Japanese Office Action for Appl No. 2022-502181 dated May 20, 2025, 3 pages.

* cited by examiner

400 →

| Condition: Low Testosterone (for illustration purposes only) | |
|---|---|
| Foods/nutrients/lifestyle | Recommendations/ dosage |
| Aspartate | D-ASP daily for 2 weeks |
| Fenugreek (trigonella) | 500 mg/day to 600 mg/day for 6 to 8 weeks |
| Tribulus | 750 mg/day for at least 4 weeks |
| Eurycoma longifolia (tongkat ali) | 200 mg/day to 400 mg/day for 5 weeks |
| Zinc | 10.4 mg/day to 250 mg/day for at least 4 weeks |
| L-arginine | 690 mg/day to 2.8 g/day for 4 weeks |
| Boron | 10 mg/day for 4 weeks |
| Magnesium | 10 mg/kg body weight daily for 4 weeks |
| Mucuna | 5000 mg/day for 12 weeks |
| Diet, exercise, weight loss | 12 week program of aerobic exercise and diet modification |
| Western-style diet (bread and pastries, dairy products, desserts) | Reduce consumption |
| Sleep | Sleep at least 8 hours/ night |
| Stress | Take action to reduce stress levels, including work stress |
| Alcohol | Consume moderately |
| Caffeine | Consume moderately |
| Fiber | More |
| Trans fats | Avoid |
| Hydration | Consume more |

FIG. 4

SYSTEM AND METHOD FOR PROVIDING FERTILITY ENHANCING DIETARY AND LIFESTYLE RECOMMENDATIONS

CROSS REFERENCE TO RELATED APPLICATIONS

The present application is a National Stage of International Application No. PCT/EP2020/071333, filed on Jul. 29, 2020. which claims priority to U.S. Provisional Patent Application No. 62/883,766, filed on Aug. 7, 2019, the entire contents of which are being incorporated herein by reference.

BACKGROUND

A significant portion of couples of childbearing age has difficulty conceiving. Such challenge can be caused by physical or mental medical conditions, or simply the passage of time, as the risk of infertility increases significantly with age. There are many physical and mental medical conditions that may affect fertility, such as excess amounts of stress, semen abnormality, endometriosis, and many more. In some cases, couples may feel strange visiting a medical professional to discuss possible fertility issues and in some cases, may not even realize they should visit a medical professional. In those cases, a couple's hesitation in seeing a medical professional may put further strain on the couple's fertility by increasing stress, tensions between the couple, and possibly delaying the discovery of other fertility-related medical conditions. In other cases, a couple experiencing fertility issues may need recommendations for altering their lifestyle or diet. Though not widely known, there exists a strong link between fertility and a couple's lifestyle and nutritional choices. Therefore, couples that are experiencing difficulty conceiving are in need of a system that provides customized, integrated recommendations for these couples along every stage of conceiving, from the planning stage onward.

SUMMARY

The present disclosure presents new and innovative methods and systems for personalized, real-time diet and lifestyle recommendations for users that are seeking to improve their own fertility. In one embodiment, a method is provided that includes requesting and receiving a plurality of user attributes, comparing the plurality of user attributes to a corresponding plurality of evidence-based fertility benchmarks, determining a plurality of fertility support opportunities based on the plurality of user attributes and the comparison to the corresponding plurality of evidence-based fertility benchmarks, identifying a plurality of fertility enhancing recommendations based on the plurality of fertility support opportunities, and presenting at least one of the plurality of fertility enhancing recommendations.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

FIG. 4 illustrates an example plurality of dietary recommendations according to an exemplary embodiment of the present disclosure.

DETAILED DESCRIPTION OF EXAMPLE EMBODIMENTS

To promote user fertility, it may be useful to provide a customized diet and lifestyle plan to users and couples interested in family planning. For example, even under similar circumstances, different users may experience differing deficiencies and levels of fertility. Therefore, a customized, integrated approach is necessary to provide maximum benefit to a couple's chances of conception. One method of providing this level of personalization is to receive information from a patient regarding certain relevant attributes and current status of conception to compare with a historical evidence-based fertility database to generate recommended diet and lifestyle options that will help improve the patient's fertility based on the provided information.

An example system may be beneficial if it can provide family support throughout the entire conception journey, from the early stages of planning to the final stages of conception. As such, this example system would be useful should it provide constant, around the clock access to both virtual and personal fertility, lifestyle, nutrition, and exercise coaches. Furthermore, an example system may provide recommendations to manage anxiety, reduce stress, or provide specific supplementation, all of which are also linked to a user's fertility.

Figure 1:
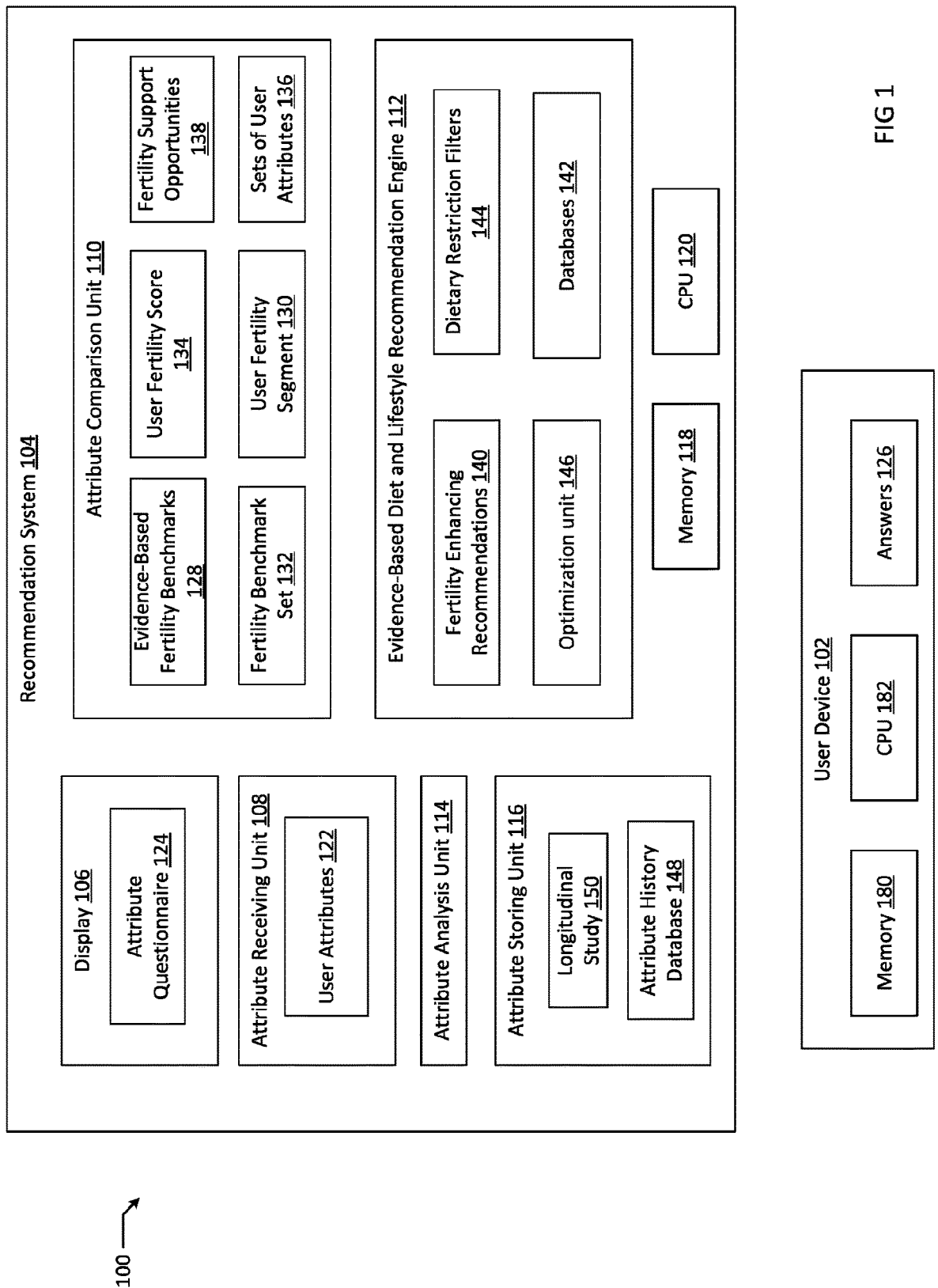
FIG. 1 illustrates a system according to an embodiment of the present disclosure.

FIG. 1 illustrates a system 100 according to an embodiment of the present disclosure. The system 100 includes a user device 102 and a recommendation system 104. The user device 102 may be implemented as a computing device, such as a computer, smartphone, tablet, smartwatch, or other wearable through which an associated user can communicate with the recommendation system 104. The user device 102 may also be implemented as, e.g., a voice assistant configured to receive voice requests from a user and to process the requests either locally on a computer device proximate to the user or on a remote computing device (e.g., at a remote computing server).

The recommendation system 104 includes one or more of a display 106, an attribute receiving unit 108, an attribute comparison unit 110, an evidence-based diet and lifestyle recommendation engine 112, an attribute analysis unit 114, an attribute storing unit 116, a memory 118, and a CPU 120. Note, that in some embodiments, a display 106 may additionally or alternatively be located within the user device 102. In an example, the recommendation system 104 may be configured to receive a request for a plurality of fertility enhancing recommendations 140. For example, a user may install an application on the user device 102 that requires the user to sign up for a recommendation service. By signing up for the service, the user device 102 may send a request for the fertility enhancing recommendations 140. In a different example, the user may use the user device 102 to access a web portal using user-specific credentials. Through this web portal, the user may cause the user device 102 to request fertility enhancing recommendations from the recommendation system 104.

In another example, the recommendation system 104 may be configured to request and receive a plurality of user attributes 122. For example, the display 106 may be configured to present an attribute questionnaire 124 to the user. The attribute receiving unit 108 may be configured to receive the user attributes 122. In one example, the attribute receiving unit 108 may receive a plurality of answers 126 based on the attribute questionnaire 124, and based on the plurality of answers, determine the plurality of user attributes 122. For example, the attribute receiving unit 108 may receive answers to the attribute questionnaire 124 suggesting that the diet of the user is equivalent to the recommended dietary allowance ("RDA") and then determine the user attributes 122 to be equivalent to the RDA, such as 100 mg/day of Vitamin C. In another example, the user device attribute receiving unit 108 may directly receive the user attributes 122 from the user device 102.

In another example, the attribute receiving unit 108 may be configured to receive the test results of a home-test kit, the results of a standardized health test administered by a medical professional, the results of a self-assessment tool used by the user, or the results of any external or third party test. Based on the results from any of these tests or tools, the attribute receiving unit 108 may be configured to determine the user attributes 122.

The recommendation system 104 may be further configured to compare the plurality of user attributes 122 to a corresponding plurality of evidence-based fertility benchmarks 128. For example, the attribute comparison unit 110 may be configured to determine a user fertility segment 130. In an example, the user fertility segment 130 may be one of a concerned planner, a healthy planner, a challenged conceiver, and a healthy conceiver. In this example, a concerned planner represents a segment in which a user is experiencing medical issues related to fertility health and is currently in a family planning stage, a healthy planner represents a segment in which a user is considered to have a healthy fertility status and currently in a family planning stage, a challenged conceiver represents a segment in which a user is experiencing medical issues related to fertility health and is actively trying to conceive, and a healthy conceiver represents a segment in which a user is considered to have a healthy fertility status and is actively trying to conceive.

In another example, the user fertility segment could be much more specific. For example, some user fertility segments may include those suffering from semen abnormality, low testosterone, endometriosis, high body mass index ("BMI"), or any other designation by which a user fertility segment may be determined.

Furthermore, the attribute comparison unit 110 may be further configured to determine a fertility benchmark set 132 based on the user fertility segment 130. For example, if the attribute comparison unit 110 determines that a user falls into the healthy planner user fertility segment 130, based on the plurality of user attributes 122, the attribute comparison unit 110 may select a fertility benchmark set 132 that has been created and defined according to the specific needs of a healthy planner. In another example, the comparison unit 110 may select a different fertility benchmark set 132 if the user was determined to be a healthy conceiver. In yet another example, the comparison unit 110 may select a fertility benchmark set 132 that corresponds to user undergoing a particular medical treatment, such as in vitro fertilization ("IVF").

The comparison unit 110 may be further configured to select, from this determined fertility benchmark set 132, the evidence-based fertility benchmarks 128 and compare the now selected evidence-based fertility benchmarks 128 to each of the corresponding user attributes 122. For example, when the fertility benchmark set 132 has been determined, in response to the determination, the attribute comparison unit 110 may compare a user attribute 122 that represents the user's vitamin C intake to an evidence based fertility benchmark 128 that represents a benchmark vitamin C intake, determining whether the user is below, at, or above the benchmark vitamin C intake. Though this example is based on a concrete, numerical comparison, another example of a benchmark comparison may be qualitative and different depending on a person. For example, a user attribute 122 may indicate that the user is currently experiencing higher than normal levels of stress. An example benchmark related to a user stress level may indicate that an average or low level of stress is desired and thus, the user attribute 122 indicating a higher level of stress is determined to be below that of the benchmark. As different users experience differing levels of stress, even under the same circumstances, such a comparison requires a customized approach.

In addition, during the comparison from the prior example, the attribute comparison unit 110 may be configured to determine a user fertility score 134 based on the comparison between the evidence-based fertility benchmarks 128 and the user attributes 122. For example, the attribute comparison unit 110 may determine a user fertility score of 95/100 if the user attributes 122 very nearly meet all or most of the corresponding evidence-based fertility benchmarks 128. In another example, a score may be represented through lettering grades, symbols, or any other system of ranking that allows a user to interpret how well their current attributes rate amongst benchmarks. This user fertility score 134 may be presented through the display 106.

The recommendation system 104 may be further configured to determine a plurality of fertility support opportunities 138 based on the plurality of user attributes 122 and the comparison to the corresponding plurality of evidence-based fertility benchmarks 128. In one example, the attribute comparison unit 110 may determine fertility support opportunities 138 for every user attribute 122 that does not meet the corresponding evidence-based fertility benchmark. In this example, a corresponding evidence-based fertility benchmark 128 may require a user have an intake of 500 mg/day of Vitamin C, whereas the user attribute may indicate the user is only receiving 200 mg/day of Vitamin C. Therefore, the attribute comparison unit 110 may determine an increase in Vitamin C intake to be a fertility support opportunity 138.

In another example, the attribute comparison unit 110 may be configured to identify a first set of user attributes 136 comprised of each of the plurality of user attributes 122 that are below the corresponding one of the plurality of evidence-based fertility benchmarks 128 as well as identify a second set of user attributes 136 comprised of each of the plurality of user attributes 122 that are greater than or equal to the corresponding evidence-based fertility benchmarks 128. While the first set of user attributes 136 is determined similarly to the above given example, the second set of user attributes 136 differs in that, although the associated user does not appear to have a deficiency, there may be opportunities to support fertility by recommending the user maintain current practices or opportunities to further improve upon them. Accordingly, the recommendation system 104 may determine opportunities to support fertility based on which attributes 122 populate either sets 136.

The recommendation system 104 may be further configured to identify a plurality of fertility enhancing recommendations 140 based on the plurality of fertility support opportunities 138. For example, the evidence-based diet and lifestyle recommendation engine 112 may be configured to be cloud-based. The recommendation engine 112 may comprise one or more of a plurality of databases 142, a plurality of dietary restriction filters 144, and an optimization unit 146. Based on the plurality of opportunities 138, the recommendation engine 112 may identify the plurality of fertility enhancing recommendations 140 according to the one or more of plurality of databases 142, the dietary restriction filters 144, and the optimization unit 146.

In another example, the recommendation system 104 may be configured to provide continuous recommendations, based on prior user attributes. For example, the recommendation system 104 may comprise, in addition to the previously discussed elements, an attribute storing unit 116 and an attribute analysis unit 114. The attribute storing unit 116 may be configured to, responsive to the attribute receiving unit 108 receiving the plurality of user attributes 122, add the received user attributes 122 to an attribute history database 148 as a new entry based on when the plurality of user attributes 122 were received. For example, if user attributes 122 are received by the attribute receiving unit 108 on a first day, the attribute storing unit 116 will add the received user attributes 122 to a cumulative attribute history database 148 noting the date of entry, in this case the first day. Later, if user attributes 122 are received by the attribute receiving unit 108 on a second day, e.g. the next day, the attribute storing unit 116 will also add these new attributes to the attribute history database 148, noting that they were received on the second day, while also preserving the earlier attributes from the first day.

This attribute analysis unit 114 may be configured to analyze the plurality of user attributes 122 stored within the attribute history database 148, wherein analyzing the stored plurality of user attributes 122 comprises performing a longitudinal study 150. Continuing the earlier example, the attribute analysis unit 114 may perform a longitudinal study of the user attributes 122 from each of the first day, the second day, and every other collection of user attributes 122 found within the attribute history database 148. The evidence based diet and lifestyle recommendation engine 112 may be further configured to generate a plurality of fertility enhancing recommendations 140 based on at least the stored user attributes 122 found within the attribute history database 148 and the analysis performed by the attribute analysis unit 114.

In an embodiment, the attribute analysis unit 114 is further configured to repeatedly analyze the plurality of user attributes 122 stored within the attribute history database 148 responsive to the attribute storing unit 116 adding a new entry to the attribute history database 148, essentially re-analyzing all of the data within the attribute history database 148 immediately after new user attributes 122 are received. Similarly, the evidence based diet and lifestyle recommendation engine 112 may be further configured to repeatedly generate the plurality of fertility enhancing recommendations 140 responsive to the attribute analysis unit 114 completing an analysis, thereby effectively generating new fertility enhancing recommendations 140 that consider all past and present user attributes 122 each time a new set of user attributes 122 is received.

Figure 2:
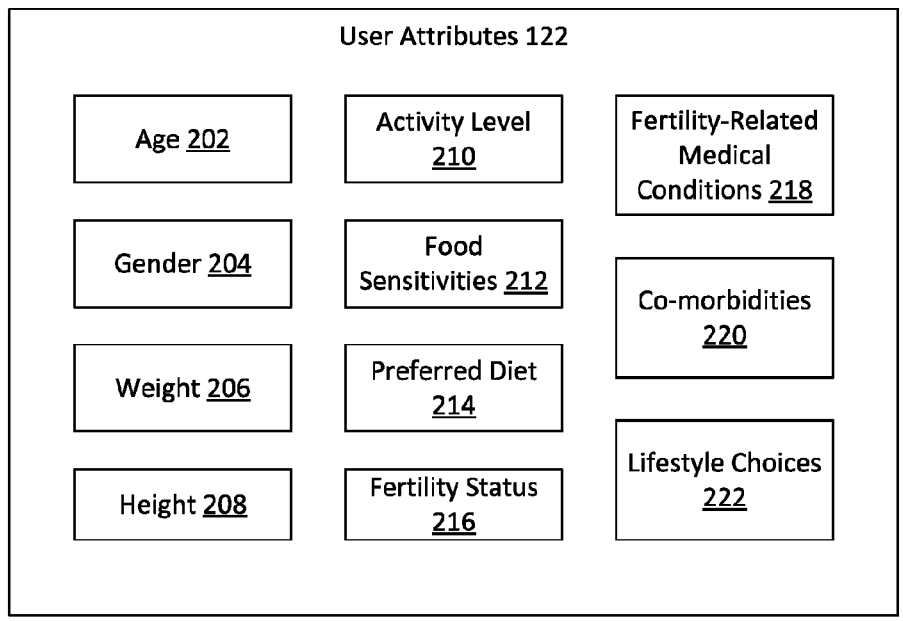
FIG. 2 illustrates system components according to exemplary embodiments of the present disclosure.

FIG. 2 illustrates an example database containing a plurality of user attributes 122. For example, the user attributes 122 may be populated by information regarding one or more of age 202, gender 204, weight 206, height 208, activity level 210, food sensitivities 212, preferred diet 214, fertility status 216, fertility-related medical conditions 218, co-morbidities 220, and lifestyle choices 222. Some examples of food sensitivities 212 include lactose, eggs, nuts, shellfish, soy, fish, and gluten sensitivities. Some non-limiting examples of a preferred diet 214 includes vegetarian, vegan, Mediterranean, kosher, halal, paleo, low carb, and low fat diets. Some non-limiting examples of fertility-related medical conditions 218 include polycystic ovary syndrome, premature ovarian insufficiency, endometriosis, recurring pregnancy loss, undergoing IVF, semen abnormality, misuse of anabolic steroids and protein supplements, erectile dysfunction, hormonal imbalance, low testosterone, and prostate issues. Some non-limiting examples of co-morbidities 220 include diabetes, obesity, high blood pressure, high cholesterol, celiac, and heartburn. Some non-limiting examples of lifestyle choices 222 may include sleeping habits such as the typical hours of sleep per night, stress attributes such as the level of stress currently experienced by the user or typical levels of stress experienced, whether the user smokes, the number of alcoholic drinks typically consumed, exercise frequency, or any other lifestyle choices 222 that may have a bearing on fertility.

Figure 3:
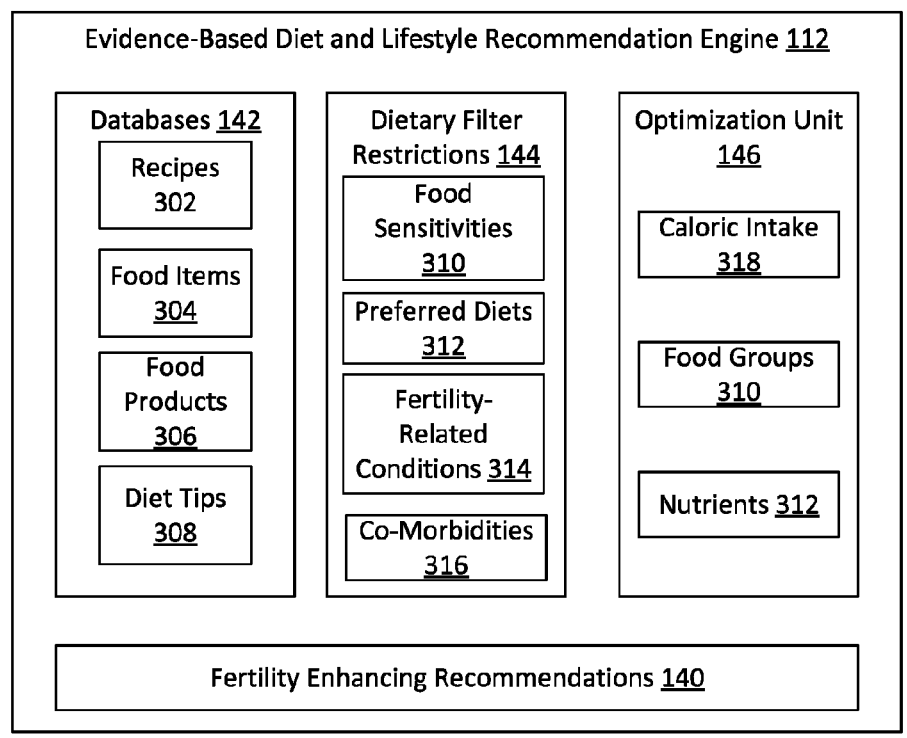
FIG. 3 illustrates system components according to an exemplary embodiment of the present disclosure.

FIG. 3 illustrates an example embodiment of an evidence-based diet and lifestyle recommendation engine 112. In an example embodiment, the evidence-based diet and lifestyle recommendation engine 112 comprises a plurality of databases 142, a plurality of dietary filter restrictions 144, and an optimization unit 146. The plurality of databases 142 may include a database comprised of one or more of recipes 302, food items 304, food products 306, and diet tips 308. The dietary filter restrictions 144 may comprise filters for one or more of food sensitivities 310, preferred diets 312, fertility-related conditions 314, and co-morbidities 316. The optimization unit 146 may contain optimization rules based on one or more of caloric intake 318, food groups 310, and specific nutrients 312.

FIG. 4 illustrates an example plurality of dietary and lifestyle recommendations according to an exemplary embodiment of the present disclosure. This dietary recommendation example 400 details specific recommendations that may be presented to a user after a plurality of fertility enhancing recommendations 140 have been determined by the recommendation system 104. Specifically, example 400 details the fertility enhancing recommendations 140 as determined for a user that has a specific fertility-related medical condition 218. Specifically, example 400 represents a the fertility enhancing recommendations as determined for a user that has low testosterone. As seen in FIG. 4, example fertility enhancing recommendations 140 may include a recommendation for a particular amount of a nutrient per day, such as 10 mg of Boron per day for four weeks. Furthermore, another recommendation 140 may include a certain amount of a particular food item, such as 500 grams to 600 grams of fenugreek per day for six to eight weeks. Other recommendations 140 may be to simply avoid, or increase, consumption of a particular food item, such as in the case of processed meat, bread and pastries, dairy products, deserts, trans fats, and fiber. Similarly, the recommendations 140 may include recommendations to consume certain substances moderately or to prefer one substance over another. Though there are many different types of recommendations 140 found within the example 400, one should appreciate that any type of qualitative or quantitative recommendation may be made regarding these food items, nutrients.

Furthermore, the recommendation system 400 may generate fertility enhancing recommendations 140 that include lifestyle changes, such as altering activity level, increasing the number of hours of rest per night, taking action to reduce stress, or similar lifestyle-affecting actions. For example, a high level of stress may negatively affect a user's fertility. Such stress may derive from the relationship between the partners actively trying to conceive. Some example fertility enhancing recommendations 140 may include suggestions for methods by which the couple may decrease tensions in the relationship in order to alleviate stress. In another example, the fertility enhancing recommendations 140 may include recommendations to increase the amount of time a user rests, including sleeping habit recommendations. These recommendations may range from general recommendations, such as instruction to get more sleep, to more detailed recommendations, including specific exercise routines, specific diets and recipes, or suggested dates for visits to a medical professional. In another example, the fertility enhancing recommendation 140 may include hydration recommendations; recommendations to avoid various types of toxins in the environment (water, food, products, air, etc).

In addition, in another embodiment, the fertility enhancing recommendations 140 generated by the recommendation system 104 may include specific recommendations for a product. For example, the recommendation system 104 may access a database containing information on a variety of supplements in the market. Then, based on its own analysis or through the use of third party research, the recommendation system 104 may analyze the different options for a specific supplement, such as Vitamin C, to determine that a specific 500 mg supplement from a first brand, Brand A, is the most beneficial supplement as compared to other 500 mg vitamin C supplements available from a second, third, and fourth brand. Such an analysis may be conducted based on the quality of the supplements, the cost of the supplements, known side effects, method of manufacture, or any other factors that may distinguish the supplement provided by one brand from a supplement provided by another brand. The recommendation system 104 may provide similar recommendations as related to food items, such as a particular type or brand of apple, and any other category of product which may require the user to select one of multiple available options. The recommendation system 104 may also provide product or food recommendations through custom meal plans or meal planning recipes but may also provide connection to food ordering and delivery platform (e.g. grubhub).

Figure 5:
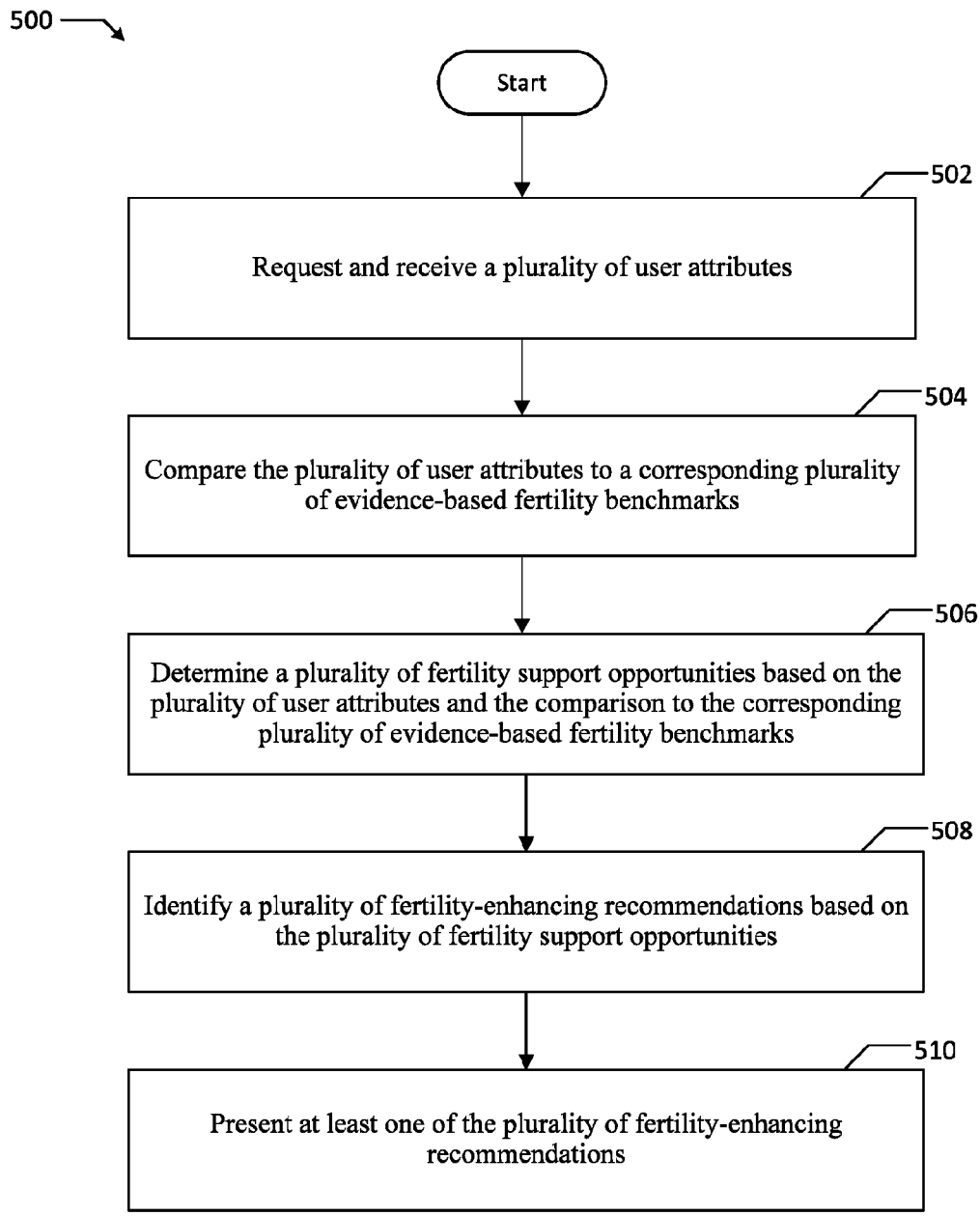
FIG. 5 illustrates a method according to an embodiment of the present disclosure.

FIG. 5 illustrates an example embodiment of a method 500 of the presently disclosed method, as was discussed above in relation to the system 100. The method 500 may be implemented in a system, such as the system 100, or on a CPU. For example, the method may be implemented by one or more of the attribute receiving unit 108, the attribute analysis unit 114, the attribute storing unit 116, the attribute comparison unit 110, the evidence-based diet and lifestyle recommendation engine 112, or the user device 102. The method 500 may also be implemented by a set of instructions stored on a computer readable medium that, when executed by a processor, cause the computer system to perform the method. For example, all or part of the method 500 may be implemented by the CPU 120 and memory 118. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional.

Block 502 can include requesting and receiving a plurality of user attributes 122. For example, a display 106 may present an attribute questionnaire 124 to solicit answers 126, to which the user device 102 provides the answers 126 to then be selected as user attributes 122. In block 504, comparisons of the plurality of user attributes 122 to a corresponding plurality of evidence-based fertility benchmarks 128 may occur. Based on these comparisons, at block 506, a plurality of fertility support opportunities 138 can be determined based on the plurality of user attributes 122 and the comparison to the corresponding plurality of evidence-based fertility benchmarks 128. At block 508, an embodiment of method 500 may identify a plurality of fertility enhancing recommendations 140 based on the plurality of fertility support opportunities 138. For example, the evidence-based diet and lifestyle recommendation engine 112 may comprise a cloud-based system trained to interpret fertility support opportunities to provide recommendations 140. Lastly, at block 510, at least one of the plurality of fertility enhancing recommendations 140 can be presented.

Figure 6A:
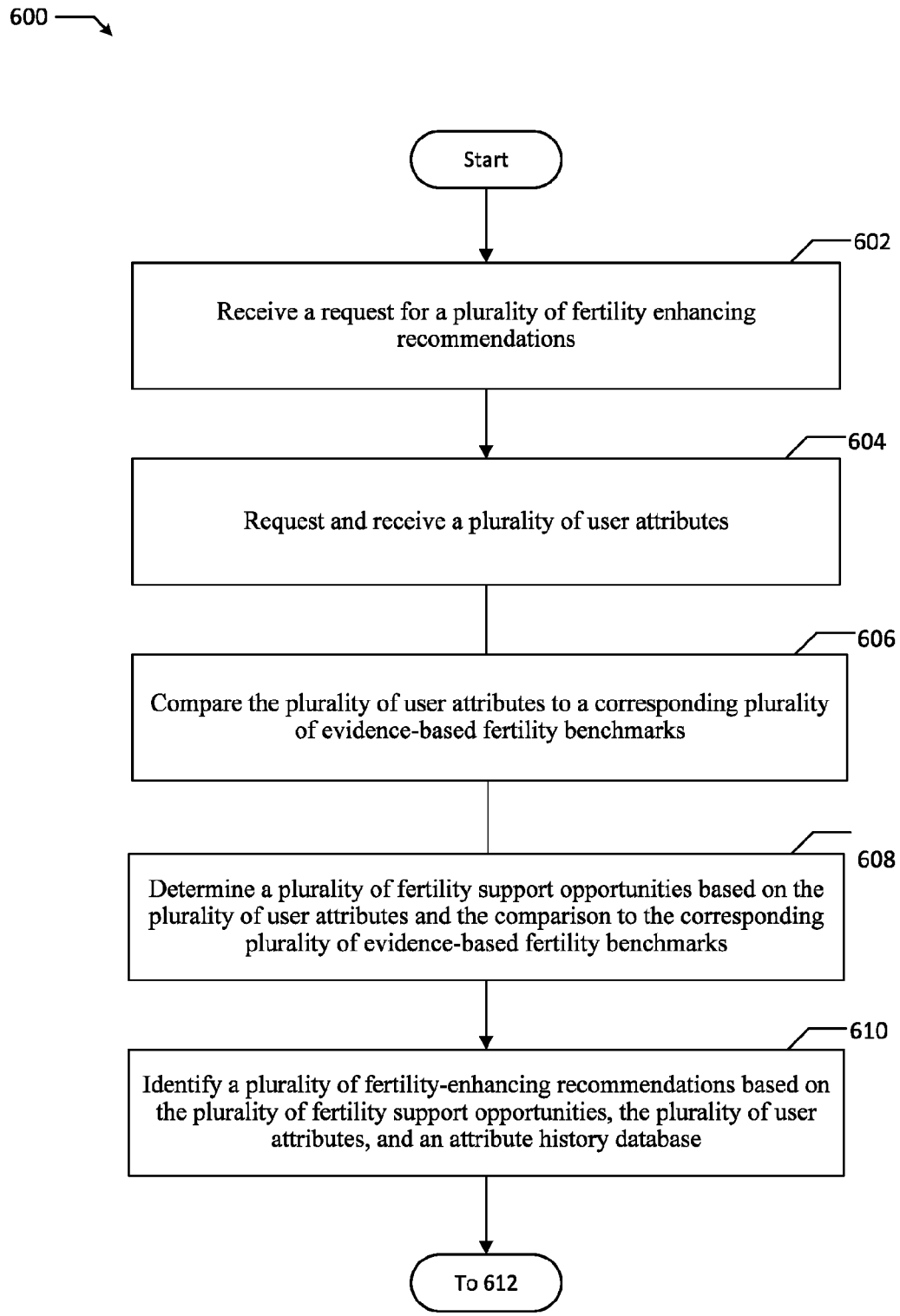
FIGS. 6A and 6B illustrate a method according to an embodiment of the present disclosure.
Figure 6B:
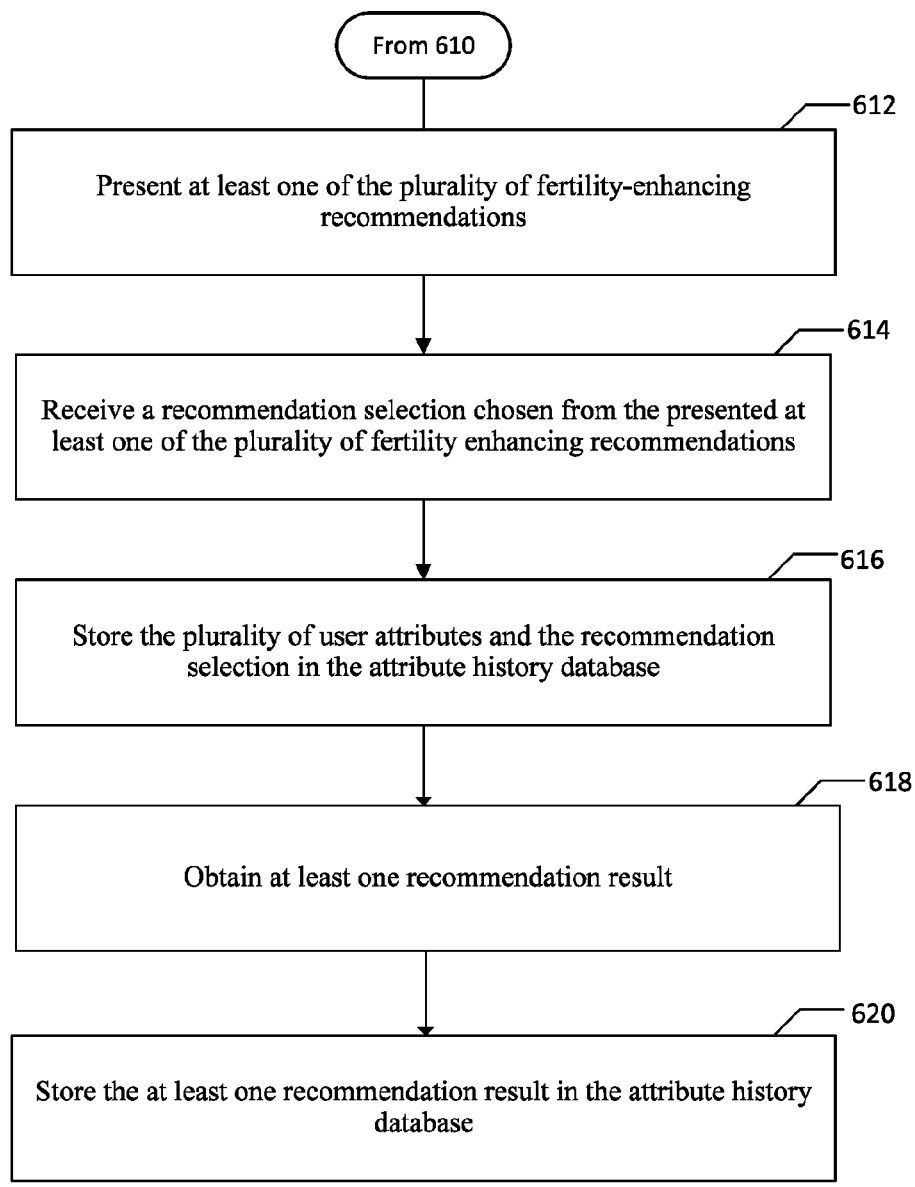

FIGS. 6A and 6B disclose an exemplary embodiment of a method 600 of the presently disclosed method. The method 600 may be implemented in a system, such as the system 100, or on a CPU. For example, the method may be implemented by one or more of the attribute receiving unit 108, the attribute analysis unit 114, the attribute storing unit 116, the attribute comparison unit 110, the evidence-based diet and lifestyle recommendation engine 112, or the user device 102. The method 600 may also be implemented by a set of instructions stored on a computer readable medium that, when executed by a processor, cause the computer system to perform the method. For example, all or part of the method 600 may be implemented by the CPU 120 and memory 118. Although the examples below are described with reference to the flowchart illustrated in FIG. 6, many other methods of performing the acts associated with FIG. 6 may be used. For example, the order of some of the blocks may be changed, certain blocks may be combined with other blocks, one or more of the blocks may be repeated, and some of the blocks described may be optional.

Block 602 may include receiving a request for a plurality of fertility enhancing recommendations 140. For example, a user may submit a request for the fertility enhancing recommendations 140 through any number of methods, including: opening an application on the user device 102, making a formal request through an application on the user device 102, submitting a request for periodic fertility enhancing recommendations 140 through the user device 102, signing into an online account through a web browser, making a formal request through a web browser, or submitting a request for periodic fertility enhancing recommendations 140 through the web browser.

At block 604, the recommendation system 104 may request and receive a plurality of user attributes 122. For example, the recommendation system 104 may present an attribute questionnaire 124 to the user. This attribute questionnaire 124 may be a standard questionnaire or a questionnaire that is customized based on known preliminary attributes, or answers to prior questions. In another example, the recommendation system 104 may request the plurality of user attributes 122 by providing a list of available home test kits, such as a testosterone test kit, that a user may use at home. Then, after the test has been performed, the recommendation system 104 may receive the results from the testosterone test and, based on these results, determine the user attributes 122 related to such a test.

In another example, at block 604, the recommendation system 104 may provide a self-assessment tool. Similar to the prior example, the user will may make use of this self-assessment tool, submitting the results to the recommendation system 104. Again, based on the received results, the recommendation system 104 may determine the user attributes 122 based on the test. In yet another example, the recommendation system 104 may request the user have a standardized health test performed by a medical professional. In this example, the results of this performed health test may be submitted to the recommendation system 104, which thereby determines the user attributes 122 based on the results. Though some specific examples as to external tests have been given, these examples are non-limiting as the recommendation system 104 may be configured to receive results of any external or third party test in order to determine the corresponding user attributes 122.

In Block 606, the recommendation system 104 may be configured to compare the plurality of user attributes 122 to a corresponding plurality of evidence-based fertility benchmarks 128. For example, these evidence-based fertility benchmarks 128 may include standardized benchmarks, as in benchmarks that are given to all, regardless of individual variances. In another example, these benchmarks 128 may be customized based on a particular user's history or goals. For example, if a healthy user is trying to improve his or her fertility and the current user attributes 122 exceeds all standard evidence-based fertility benchmarks 128, the recommendation system 104 may be configured to determine a customized fertility benchmark set 132 for which the particular user should aim. In contrast, in another example, a different user that is far below a standard evidence-based fertility benchmark 128 may be compared to a different, lower benchmark value as a manner of inspiring progress and providing milestones.

The example method, at Block 608, may be configured to determine a plurality of fertility support opportunities 138 based on the plurality of user attributes 122 and the comparison to the corresponding plurality of evidence-based fertility benchmarks 128. For example, the recommendation system 104 may determine that a user attribute 122 corresponds to an above optimal stress level. Based on this comparison, the recommendation system 104 may determine a fertility support opportunity 138 to reduce stress. In another example, the recommendation system 104 may determine that the user has not yet seen a medical professional, and, as such, determine a fertility support opportunity 138 to visit a medical professional.

At Block 610, the recommendation system 104 may identify a plurality of fertility-enhancing recommendations 140 based on at least the plurality of fertility support opportunities 138. For example, the recommendation system may determine a plurality of similar prior cases by analyzing the attribute history database 148, identifying similarities between the user attributes 122 received and the plurality of prior user attributes within the attribute history database 148. For example, the recommendation system 104 may identify that the user attributes 122 detail a user with an above average BMI and other similarities that correspond to a particular group of past users and therefore the cases of those member of that particular group of past users are determined as similar prior cases.

Furthermore, in this example, the recommendation system 104 may determine a plurality of prior case results based on the plurality of similar prior cases. As detailed previously, the attribute history database 148 may comprise corresponding recommendations associated with prior user attributes, and the effectiveness of these corresponding recommendations. As such, the recommendation system 104 may analyze the corresponding recommendations and their effectiveness as associated with the particular group of past users to determine a plurality of prior case results.

Furthermore, in this example, the recommendation system 104 may determine successful recommendations and a plurality of unsuccessful recommendations based on a plurality of prior case results. For example, the recommendation system 104 may have recommended the users in that particular group of past users increase exercise levels in some cases and decrease food consumption in other cases. Based on prior case results as determined based on the attribute history database 148, the recommendation system 104 may determine that the recommendations for decreasing food consumption were not very successful, yet increasing exercise levels proved to be very successful and, as such, determines that increasing exercise levels is a successful recommendation whereas decreasing food consumption is an unsuccessful recommendation. By conducting analysis of these prior user attributes, the recommendation selection and the effectiveness of corresponding recommendations, the recommendation system 104 may identify trends associated with different subset patient populations, thereby creating and validating a plurality of lifestyle interventions. These examples of successful and unsuccessful recommendations are nonlimiting, as different groups may experience different levels of success to the same recommendations.

In addition, the recommendation system 104 may be configured to determine a plurality of fertility enhancing recommendations based on the plurality of successful recommendations and the plurality of unsuccessful recommendations. For example, the recommendation system 104 may be configured to only recommend the plurality of successful recommendations. In another example, the recommendation system 104 may still recommend any of the unsuccessful recommendations. The recommendation system 104 may make these recommendations based on any number of reasons, including a slight difference in the user attributes 122 as compared to the prior user attributes, a lack of insufficient data to support a true unsuccessful recommendation, or data supporting that, although unsuccessful, the recommendation is popular and often followed through by users. In another example, the recommendation system 104 may recommend less than all of the plurality of successful recommendations. In an example, the decision for selecting which of the plurality of recommendations to present generate may be performed by an AI.

In another example, successful recommendations may be based on guidelines associated with particular medical conditions, such as a user that is undergoing IVF. In that case, these guidelines would be determined as successful recommendations.

At Block 612, the recommendation system may present at least one of the plurality of fertility-enhancing recommendations 140. At Block 614, the recommendation system 104 may receive a recommendation selection chosen from the presented at least one of the plurality of fertility enhancing recommendations 140. For example, a user may be presented with three fertility-enhancing recommendations 140, to drink less alcohol, to increase exercise, and to eat more fruit. The user may select one, two, or all three of these options. In an example, the user may use the user device 102 to select the fertility-enhancing recommendations 140 to increase exercise and to eat more fruit. As such, the recommendation system 104 receives, from the user device 102, these two selected recommendations as the recommendation selection. In another example, the user may not select any of the presented recommendations, at which point the recommendation system 104 may generate and present a different plurality of fertility enhancing recommendations 140.

In another example, after the user reviews the presented fertility enhancing recommendations 140, the user may submit a request to contact a fertility coach. For example, the user may be undecided as to how to implement the recommendations or may simply have a question for which the user seeks an answer. In some instances, the recommendation system 104 may determine that the question for which the user seeks an answer may be adequately answered by a virtual coach, and thereby provides access to and interaction with said virtual coach. In other instances, the recommendation system 104 may determine that the question will be best handled by a personal coach, a living individual, and thereby provides access to and interaction with said personal coach.

At Block 616, the recommendation system 104 may store the plurality of user attributes 122 and the recommendation selection in the attribute history database 148. For example, the recommendation system 104 may store all user attributes 122 received on a first day, along with the recommendation selection received on that same first day. These user attributes 122 and recommendation selection may then be accessed by the recommendation system 104 in the future when analyzing the attribute history database 148.

The recommendation system 104 may obtain at least one recommendation result at Block 618. In an example, the user may submit a recommendation result through the user device 102. This result may include a qualitative or quantitative rating as selected by the user. In another example, the recommendation system 104 may receive a future plurality of user attributes 122 and, at that time, compare the received future user attributes with the previously received user attributes, now prior user attributes, within the attribute history database 148. Based on this comparison, the recommendation system 104 may determine a recommendation result, such as decreased or increased BMI. After obtaining this recommendation result, the recommendation system 104 may store the at least one recommendation result in the attribute history database 148, corresponding to the prior recommendation selection. This recommendation system 104 may then await another request for fertility enhancing recommendations 140, and at that time, perform the method 600 again at Block 602.

Such an example method as disclosed in FIGS. 6A and 6B allow for the continuous, customized, integrated recommendation system 104 to endlessly improve upon recommendations as the attribute history database 148 grows in size. Through this growth, the recommendation system 104, and in some embodiments, the evidence-based diet and lifestyle recommendation engine 112, will have an ever-expanding set of data from which it can derive fertility enhancing recommendations 140, with increasing particularity regarding what users receive which recommendations.

In another aspect, a method of treatment may comprise using any of the above described systems or methods to generate any one or more of the fertility enhancing recommendations 140, diet and lifestyle recommendations, or specific supplementation recommendations. Furthermore, the method of treatment may comprise administering a treatment based on at least the any of one or more of the fertility enhancing recommendations 140, diet and lifestyle recommendations, or specific supplementation recommendations to a user. For example, when the recommendation system 104 determines a fertility enhancing recommendation 140 that comprises increasing a user's vitamin C intake from 200 mg/day to 500 mg/day by way of a 300 mg vitamin C supplement, an example method of treatment may comprise administering a treatment comprising a 300 mg vitamin C supplement to the user each day.

All of the disclosed methods and procedures described in this disclosure can be implemented using one or more computer programs or components. These components may be provided as a series of computer instructions on any conventional computer readable medium or machine-readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A system for generating fertility enhancing recommendations comprising:
   a memory;
   a Central Processing Unit (CPU);
   an attribute receiving unit configured to receive a plurality of diet and lifestyle attributes;
   an attribute storing unit configured to, responsive to the attribute receiving unit receiving the plurality of diet and lifestyle attributes, add the plurality of diet and lifestyle attributes to an attribute history database as a new entry based on at least when the plurality of diet and lifestyle attributes were received;
   an attribute analysis unit configured to analyze the plurality of diet and lifestyle attributes stored within the attribute history database, wherein analyzing the stored plurality of diet and lifestyle attributes comprises performing a longitudinal study;
   an evidence-based diet and lifestyle recommendation engine configured to generate a plurality of fertility enhancing recommendations based on at least the stored plurality of diet and lifestyle attributes and the analysis performed by the attribute analysis unit; and
   a display configured to present at least one of the plurality of fertility enhancing recommendations,
   wherein the attribute analysis unit is further configured to repeatedly analyze the plurality of diet and lifestyle attributes stored within the attribute history database responsive to the attribute storing unit adding the new entry to the attribute history database, and
   wherein the evidenced-based diet and lifestyle recommendation engine is further configured to repeatedly generate the plurality of fertility-enhancing recommendations responsive to the attribute analysis unit completing an analysis, which prompts a user to implement at least one of the plurality of fertility-enhancing recommendations;

wherein the plurality of fertility enhancing recommendations are selected from the group consisting of:
a recommendation for a particular amount of a nutrient per day;
a recommendation for a certain amount of a particular food item;
a recommendation to avoid or increase consumption of a particular food item;
a recommendation to consume certain substances moderately;
a recommendation to prefer one substance over another;
a recommendation for a lifestyle change;
a hydration recommendation;
a recommendation to avoid various types of toxins in the environment; and
a specific recommendation for a product; and combinations thereof.

2. The system of claim 1, wherein the plurality of diet and lifestyle attributes comprises information regarding at least one of age, gender, weight, height, activity level, food sensitivities, preferred diet, fertility status, lifestyle choices, any fertility-related medical conditions, and any co-morbidities.

3. The system of claim 1, wherein the evidence-based diet and lifestyle recommendation engine comprises:
a plurality of databases comprising one or more of recipes, specific food items, products, or diet tips;
a plurality of filters by dietary restrictions comprising one or more of food sensitivities, preferred diets, fertility-related conditions, or co-morbidities; and
an optimization unit configured to optimize the plurality of fertility enhancing recommendations based on one or more of caloric intake, food groups, or nutrients.

4. The system of claim 1 comprising an attribute comparison unit configured to compare the received plurality of diet and lifestyle attributes to a corresponding plurality of fertility attribute benchmarks.

5. The system of claim 4, wherein the attribute comparison unit is further configured to: determine a user fertility segment based on at least the plurality of diet and lifestyle attributes;
determine a fertility benchmark set based on at least the user fertility segment; and
select the fertility benchmark set as the corresponding plurality of evidence-based fertility benchmarks.

6. The system of claim 4, wherein the attribute comparison unit is further configured to determine a user fertility score based on at least the comparisons.

* * * * *